United States Patent
Colrain et al.

(10) Patent No.: US 6,892,205 B1
(45) Date of Patent: May 10, 2005

(54) SYSTEM AND METHOD FOR PRE-COMPILING A SOURCE CURSOR INTO A TARGET LIBRARY CACHE

(75) Inventors: Carol L. Colrain, Redwood Shores, CA (US); Namit Jain, Foster City, CA (US); Juan R. Loaiza, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 556 days.

(21) Appl. No.: 10/086,842

(22) Filed: Feb. 28, 2002

Related U.S. Application Data
(60) Provisional application No. 60/272,386, filed on Feb. 28, 2001.

(51) Int. Cl.[7] .............................................. G06F 17/00
(52) U.S. Cl. ............................ 707/100; 707/4; 707/202
(58) Field of Search ............................. 707/1–5, 8–10, 707/100–104.1, 200–203, 217–219; 714/1, 2, 15; 715/700, 733, 853

(56) References Cited

U.S. PATENT DOCUMENTS

| | | | |
|---|---|---|---|
| 5,623,666 A | | 4/1997 | Pike et al. |
| 5,659,781 A | | 8/1997 | Larson |
| 5,706,516 A | * | 1/1998 | Chang et al. ............... 719/314 |
| 5,727,206 A | | 3/1998 | Fish et al. |
| 5,802,523 A | * | 9/1998 | Jasuja et al. ............ 707/103 R |
| 5,828,876 A | | 10/1998 | Fish et al. |
| 5,872,981 A | | 2/1999 | Waddington et al. |
| 5,890,153 A | | 3/1999 | Fukuda et al. |
| 6,108,654 A | | 8/2000 | Chan et al. |
| 6,401,120 B1 | | 6/2002 | Gamache et al. |
| 6,490,610 B1 | | 12/2002 | Rizvi et al. |
| 6,625,602 B1 | | 9/2003 | Meredith et al. |
| 6,772,255 B2 | | 8/2004 | Daynes |
| 6,799,173 B2 | * | 9/2004 | Czajkowski et al. ........... 707/2 |

OTHER PUBLICATIONS

Gray J et al., "Transaction Processing: Concepts and Techniques," 1993, pp. 128–138, Morgan Kaufman, San Francisco, CA.

* cited by examiner

*Primary Examiner*—Greta Robinson
*Assistant Examiner*—Harold E. Dodds, Jr.
(74) *Attorney, Agent, or Firm*—Christopher J. Brokaw; Hickman Palermo Truong & Becker LLP

(57) ABSTRACT

A system and method for enabling a second database instance to more quickly process a request to execute a database statement that has previously been executed by a first database instance is described. In one embodiment, the method involves sending the database statement from the first database instance to the second database instance, and generating by the second database instance one or more structures needed to prepare the statement for execution, such as a parse tree and an execution plan for the statement. If at some point in the future, the second database instance receives a request to execute the same statement, the above structures can be used for execution, thereby eliminating the need for one or more potentially time-consuming operations, such as generation of a parse tree or execution plan for the statement.

24 Claims, 11 Drawing Sheets

SYSTEM AND METHOD FOR PRE-COMPILING A SOURCE CURSOR INTO A TARGET LIBRARY CACHE

CROSS-REFERENCE TO RELATED APPLICATION

This patent application claims priority under 35 U.S.C. § 119(e) to provisional patent application Ser. No. 60/272,386, filed Feb. 28, 2001, the disclosure of which is incorporated by reference.

FIELD OF THE INVENTION

The present invention relates in general to systems and methods with high availability operating requirements and, in particular, to a system and method for pre-compiling a source cursor into a target library cache.

BACKGROUND OF THE INVENTION

Cluster databases provide location transparency to data by allowing multiple systems to serve the same database. One specific type of cluster database is the Oracle Real Application Clusters product, licensed by Oracle Corporation, Redwood Shores, Calif. Sets of two or more computers are grouped into real application clusters. The clusters harness the processing power of multiple interconnected computers to provide a single robust computing environment. Within each cluster, all nodes concurrently execute transactions against the same database to synergistically extend the processing power beyond the limits of an individual component. Upon the mounting of the shared database, the real application cluster processes a stream of concurrent transactions using multiple processors on different nodes. For scale-up, each processor processes many transactions. For speed up, one transaction can be executed spanning multiple nodes.

Cluster databases provide several advantages over databases that use only single nodes. For example, cluster databases take advantage of information sharing by many nodes to enhance performance and database availability. In addition, applications can be sped up by executing across multiple nodes and can be scaled-up by adding more transactions to additional nodes. Multiple nodes also make cluster databases highly available through a redundancy of nodes executing separate database instances. Thus, if a node or database instance fails, the database instance is automatically recovered by the other instances which combine to serve the cluster database.

Cluster databases can be made more highly available through integration with high availability frameworks for each cluster. The inclusion of these components provides guaranteed service levels and ensures resilient database performance and dependable application recovery. Organizationally, individual database servers are formed into interconnected clusters of independent nodes. Each node communicates with other nodes using the interconnection. Upon an unplanned failure of an active database server node, using clusterware, an application will fail over to another node and resume operations, without transaction loss, within a guaranteed time period. Likewise, upon a planned shutdown, an application will be gracefully switched over to another node in an orderly fashion.

The guarantee of service level thresholds is particularly crucial for commercial transaction-based database applications, such as used in the transportation, finance, and electronic commerce industries. System downtime translates to lost revenue and loss of market share. Any time spent recovering from a system failure is measurable in terms of lost transactions. Consequently, high availability systems budget a set time period to help minimize lost revenue due to unplanned outages. High availability systems also budget for planned service interruptions.

Database servers operating in the database server tier implement memory caches to transiently stage data and instructions to improve overall system performance. These memory caches take advantage of the locality of data and parsed SQL as physically stored in secondary storage. Performance is enhanced by maintaining active sets of data and parsed SQL within the memory cache (system global area) to avoid incurring latencies while waiting on the retrieval of data and instructions from the secondary storage, or to reparse the SQL.

In particular, database servers implement library caches and buffer caches. Library caches store parsed SQL and parsed PL/SQL. These caches employ a cache replacement scheme staging the most recently used SQL and the SQL having the largest context areas. Within the library cache, parsed SQL is stored as cursors. The cursors are indexed by handlers referencing memory locations within which parsed statements and information relating to processing are stored. A context area is a shared area of memory that stores the environment and session variables for an instruction. Buffer caches store active data and use a cache replacement scheme storing the most recently used data.

Following a failover or switchover from an active node of a clustered system, the library and buffer caches on a standby node of a clustered system are effectively empty. Response times are slow until these caches are restored with SQL cursors and data. This ramp-up period lasts from the time that the application session resumes operation on the new database instance to the time that response times return to normal levels. Processing performed during the ramp-up period is inefficient, as the amount of work completed per transaction is higher due to the need to re-initialize the memory caches. Moreover, the extra work is serialized due to locking on the library and buffer caches and is duplicative of work already accomplished on the failed node.

SUMMARY OF THE INVENTION

A system and method for enabling a second database instance to more quickly process a request to execute a database statement that has previously been executed by a first database instance is described. In one embodiment, the method involves sending the database statement from the first database instance to the second database instance, and generating by the second database instance one or more structures needed to prepare the statement for execution, such as a parse tree and an execution plan for the statement. If at some point in the future, the second database instance receives a request to execute the same statement, the above structures can be used for execution, thereby eliminating the need for one or more potentially time-consuming operations, such as generation of a parse tree or execution plan for the statement.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
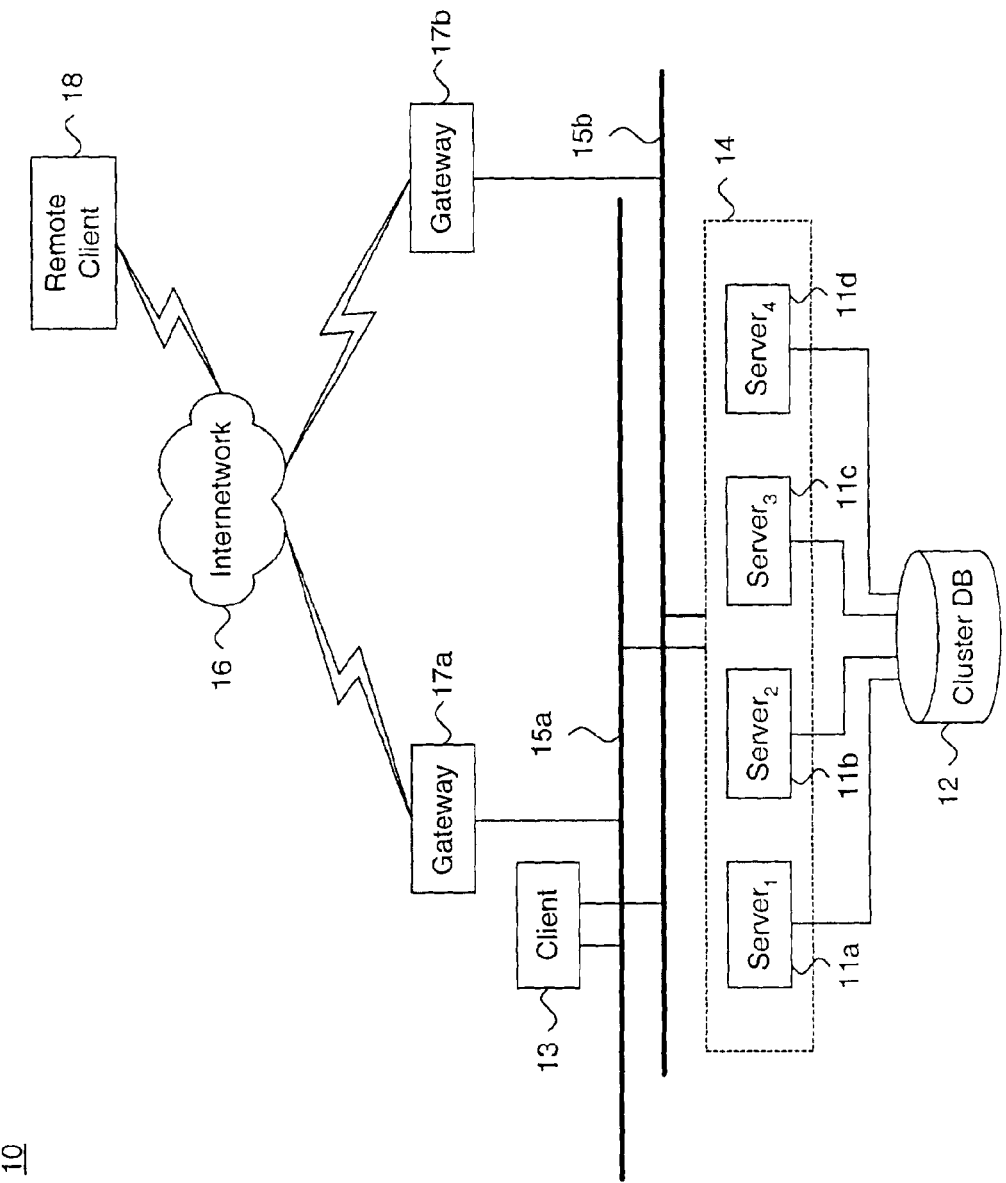
FIG. 1 is block diagram showing a cluster computing environment including cluster databases incorporating high availability components.

FIG. 1 is a block diagram showing a cluster database 12 incorporating high availability components. Parallel database servers 11a–d, each including a cooperative resource group are each coupled to a single cluster database 12 to form a high availability cluster framework 14, such as described in pending U.S. patent application, Ser. No. 10/086,782, entitled "System and Method For Providing Cooperative Resource Groups For High Availability Applications," filed Feb. 28, 2002, the disclosure of which is incorporated by reference. The servers 11 process a stream of transactions received from clients, such as client 13 and remote client 18, in parallel with each server processing an entire transaction.

Operationally, the remote client 18 is interconnected to the servers 11a–d via an internetwork 16, such as the Internet. Servers 11a–d and client 13 are interconnected via intranetworks 15a, 15b. Both intranetworks 15a and 15b are respectively interconnected to the internetwork 16 through gateways 17a–b. Other network topologies and configurations, including various combinations of intranetworks and internetworks are feasible, as would be recognized by one skilled in the art.

The cluster framework 14 appears as a single node to individual clients, which subscribe to the servers published by each cluster. The client sessions receive notification of any changes in the services provided, such as described in pending U.S. patent application Ser. No. 10/086,949, entitled "system and Method For Providing Out-Of-Band Notification of Service Changes," filed Feb. 29, 2002, the disclosure of which in incorporated by reference, and transfer to alternate nodes as necessary.

Within each cluster framework 14, each of the database servers 11 incorporate high availability components, such as described in J. Gray et al., "Transaction Processing: Concepts and Techniques," pp. 128–38, M. Kaufmann Pubs., San Francisco, Calif. (1993), the disclosure of which is incorporated by reference. Failover processing is initiated upon the detection of the termination of a database instance, such as described in pending U.S. patent application Ser. No. 10/087,494, entitled "System and Method For Detecting Termination Of An Application Instance Using Locks," filed Feb. 28, 2002, the disclosure of which is incorporated by reference. Likewise, upon a planned shutdown, an application will switch over to another instance of the database supporting the service. Other situations in which failover processing is required are possible, as would be recognized by one skilled in the art.

The response times provided by the substitute database servers 12 in the standby node may be longer than prior to failover or switchover until the ramp-up period for populating the database instance caches has run, although the ramp-up period can be substantially minimized by pre-connecting to each standby node and warming the database instance caches beforehand, as further described below beginning with reference to FIG. 2.

The individual computer systems, including database servers 11, clients 13, and remote clients 18, are general purpose, programmed digital computing devices consisting of a central processing unit (CPU), random access memory (RAM), non-volatile secondary storage, such as a hard drive or CD-ROM drive, network interfaces, and peripheral devices, including user-interfacing means, such as a keyboard and display. Program code, including software programs, and data are loaded into the RAM for execution and processing by the CPU and results are generated for display, output, transmittal, or storage.

Figure 2:
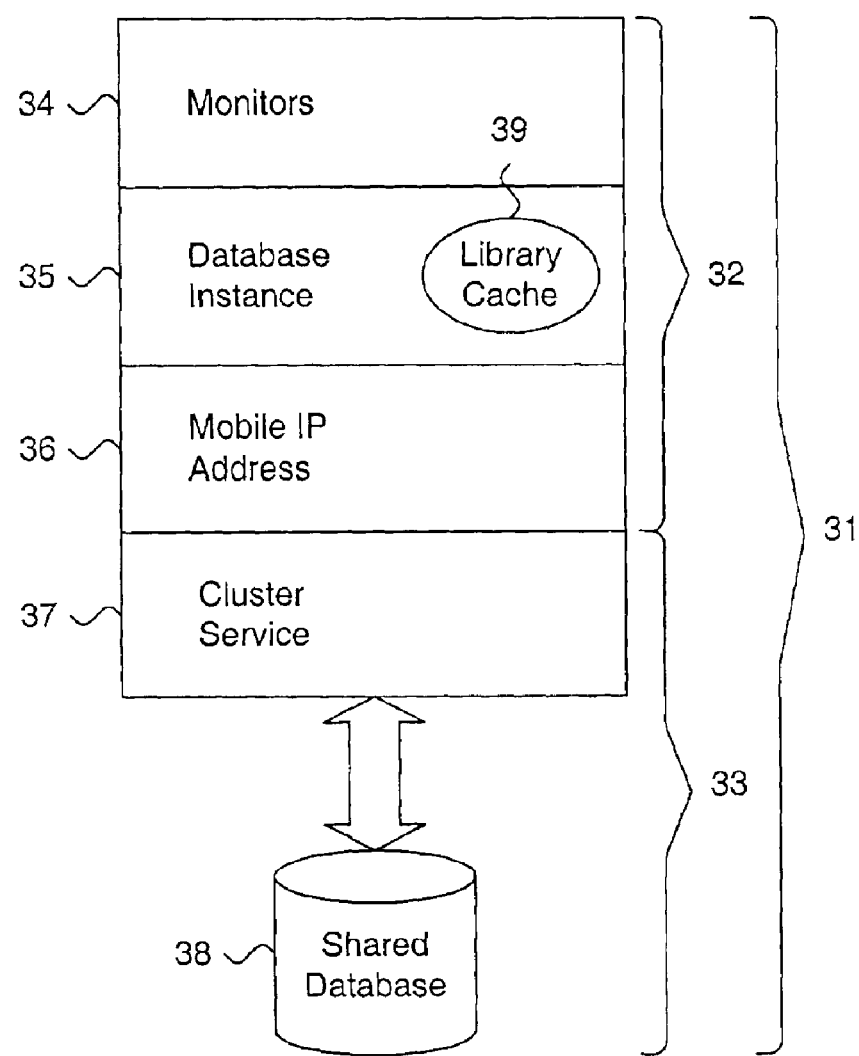
FIG. 2 is a functional block diagram showing a database stack implemented on a server node, including any library cache, in accordance with the present invention.

FIG. 2 is a functional block diagram showing a database stack 31 implemented on a server node 30, including a system for detecting termination of a database instance using locks, such as described in pending U.S. patent application Ser. No. 10/087,494, entitled "System and Method For Detecting Termination Of An Application Instance Using Locks," filed Feb. 28, 2002, the disclosure of which is incorporated by reference. The database stack 31 is logically divided into two parts: a cooperative resource group 32, and a resource 33. The cooperative resource group 32 includes a mobile internet protocol (IP) address 36, a database instance 35 (or high availability application), and external monitors 34. The mobile IP address 36 is assigned to the cooperative resource group 32 to support client access. More generally, a generic high availability application could execute within the cooperative resource group 32, instead of the database instance 35, as would be recognized by one skilled in the art. The database stack 31 is logically divided into two parts: a cooperative resource group 32, and a resource 33. The cooperative resource group 32 includes a mobile internet protocol (IP) address 36, a database instance 35 (or high availability application), and external monitors 34. The mobile IP address 36 is assigned to the cooperative resource group 32 to support client access. More generally, a generic high availability application could execute within the cooperative resource group 32, instead of the database instance 35, as would be recognized by one skilled in the art.

The monitors 34 detect the failure of the database instance 35 or the loss of access to a resource 33, plus "hang" situations. The resource 33 includes a cluster service 37 and a shared database 38, as well as physical hardware devices, such as disk drives and network cards, and logical items, such as volume groups, TCP/IP addresses, applications, and database instances.

Within each cluster framework 14 (shown in FIG. 1), the cluster service 37 executes all operations on the cooperative resource group 32. To improve performance, the database instance 35 includes a library cache 39 that stores frequently used SQL cursors. In the library cache 39, SQL cursors are stored as cursors which are SQL objects that enumerate the records in a dataset and allow the cache to update or delete the current element addressed by the cursor. The information staged in the library cache 39 constitutes an active set of information most recently used by the database instance 35. Following a failover or switchover to a standby node, the library cache 39 must be repopulated with staged information. A ramp-up period, lasting from the time that the application session resumes operation on a substitute node to the time that response times return to normal levels, can be substantially minimized by pre-compiling the cursors stored in the library cache 39, such as described below in a generalized fashion with reference to FIG. 9.

Figure 3:
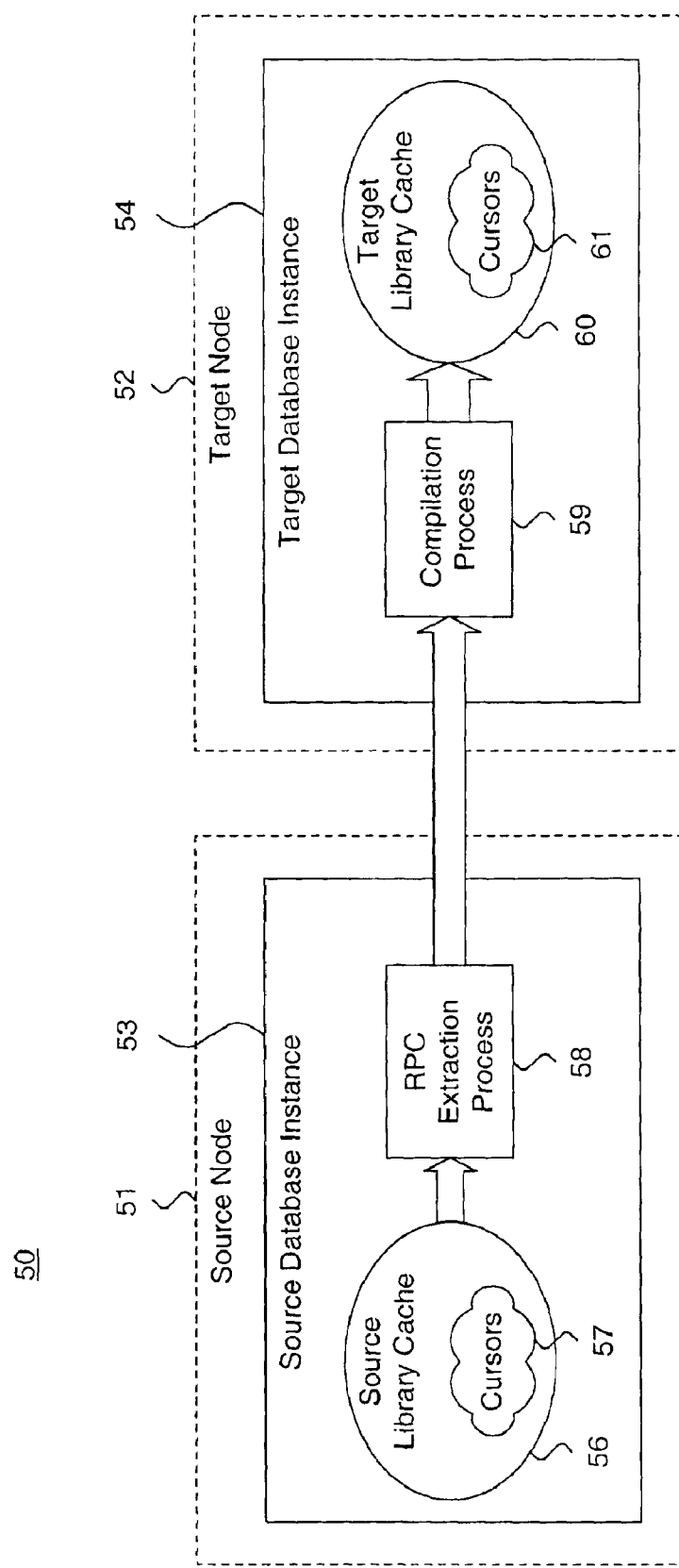
FIG. 3 is a block diagram showing a system for pre-compiling a source cursor into a target library cache in accordance with the present invention.

FIG. 3 is a block diagram showing a system 50 for pre-compiling a source cursor into a target library cache 56 in accordance with the present invention. A source database instance 53 executes on a source node 51 while a target database instance 54 executes on a target node 52. Alternatively, the source database instance 53 and target database instance 54 could be executing on the same node. The source library cache 56 is compiled at the target database instance 54 using SQL and PL/SQL cursors extracted from the source database instance 53. The SQL and PL/SQL cursors are extracted from the source library cache 56 through a remote procedure call (RPC) extraction process 58, as further described below with reference to FIG. 6. The extracted SQL cursors are then compiled at the target database instance 54 using a compilation process 59 into cursors 61, as further described below beginning with reference to FIG. 7. Only user cursors 57 or cursors for the source database instance 53 are pre-compiled while recursive and system cursors are recreated.

The process of "warming" the target library cache 60, that is, pre-compiling extracted SQL and PL/SQL statements, requires the execution of both the extraction process 58 and compilation process 59. These processes are executed from the target database instance 54 using two complementary approaches. For planned outages, the processes are executed immediately before switchover. For unplanned outages, the processes are executed on a regular scheduled basis after the source library cache 56 on the source node 51 has stabilized.

Each module within the extraction process 58 and the completion process 59 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The extraction process 58 and compilation process 59 operate in accordance with a sequence of process steps, as further described below beginning with reference to FIGS. 6 and 7, respectively.

Figure 4:
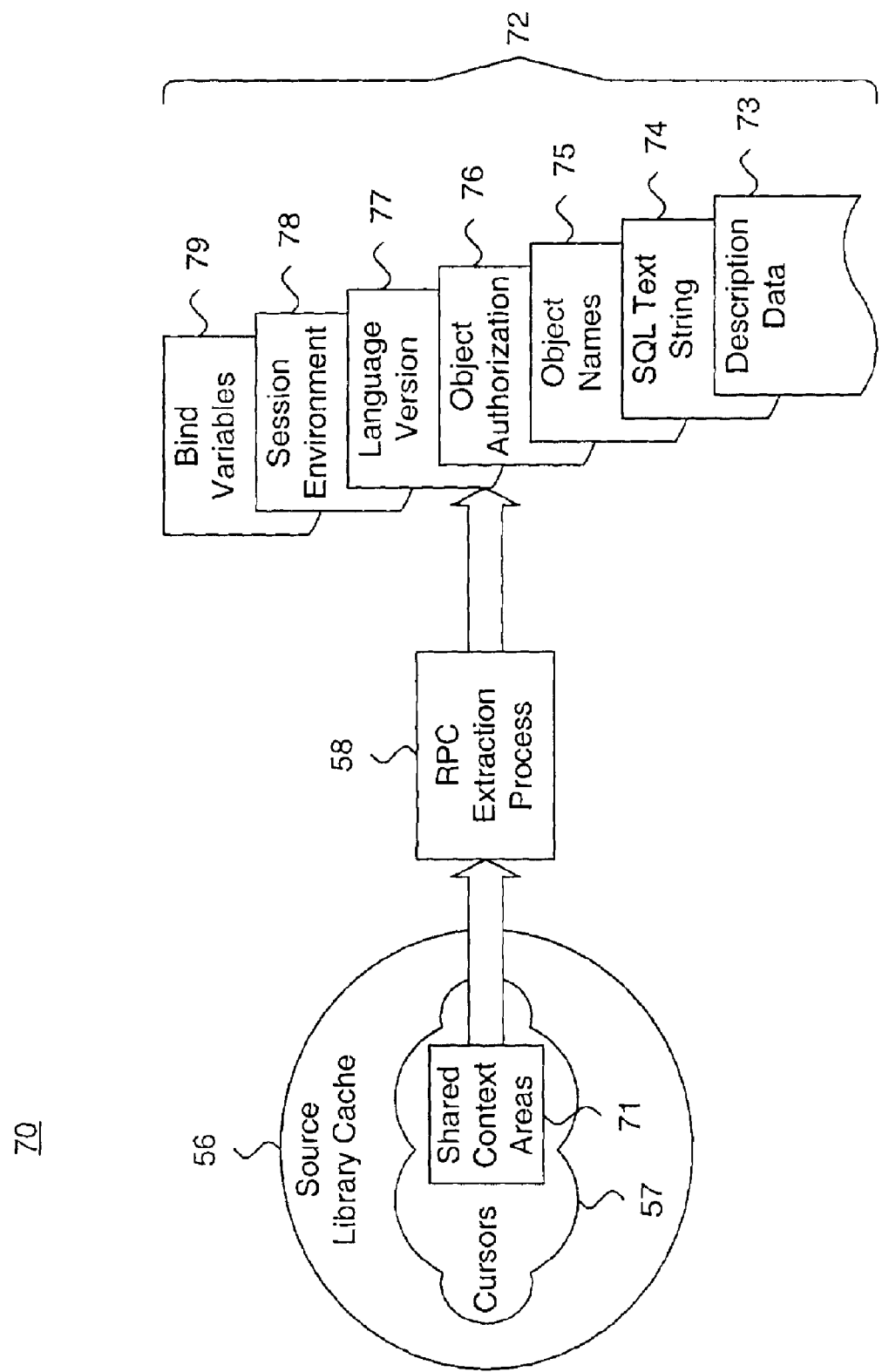
FIG. 4 is a dataflow diagram showing the extraction process of FIG. 3.

FIG. 4 is a dataflow diagram showing the extraction process 70 of FIG. 3. The purpose of the extraction process is to extract cursors 57 from the source library cache 56. A cursor 57 is a handler name for a private SQL area in memory in which a parsed statement and other information for processing are kept, as further described in Oracle 8i Concepts, Release 8.1.6, Ch. 15, Oracle Corporation, Redwood Shores, Calif. (2000), the disclosure of which is incorporated by reference.

Each cursor 57 includes a sharable part and a private, mutable part. The sharable part is public and is independent of the user executing the statement. The sharable part also depends on the text string and the executing environment, and is created during the parse-type check and describe phases. The sharable part is constant and the process for preparing the target library cache 60 compiles the sharable part. The private part depends on the values bound by the session issuing the statement and is modified during execution time. The private part is not extracted from the source library cache 56 and is instead dynamically established when the cursors 61 in the target library cache 60 are executed after failover.

The sharable part is managed in the source library cache 56 and is kept in a memory sequence known as a shared context area 71. This area is modified when each cursor 57 is created and again when the cursor 57 is aged out of the source library cache 56. During the extraction process 58, those SQL and PL/SQL statements having the largest shared context areas and those statements that are most frequently executed are chosen for extraction.

The following command types at this time are extracted from the source library cache 56 (shown in FIG. 3):
 (1) SQL cursors for Select statements.
 (2) SQL cursors for data manipulation to the bind stage, including Insert, Update and Delete statements.
 (3) PL/SQL cursors to the bind stage, including the shared memory heap.
 (4) Row cache objects as a side effect of the type definition issued for SQL cursors.
 (5) Schema objects as a side effect of the type definition issued for SQL cursors.
 (6) Recursive SQL in the data dictionary as a side effect of the data compilation process.
Other command types can also be extracted, as would be recognized by one skilled in the art.

Figure 5:
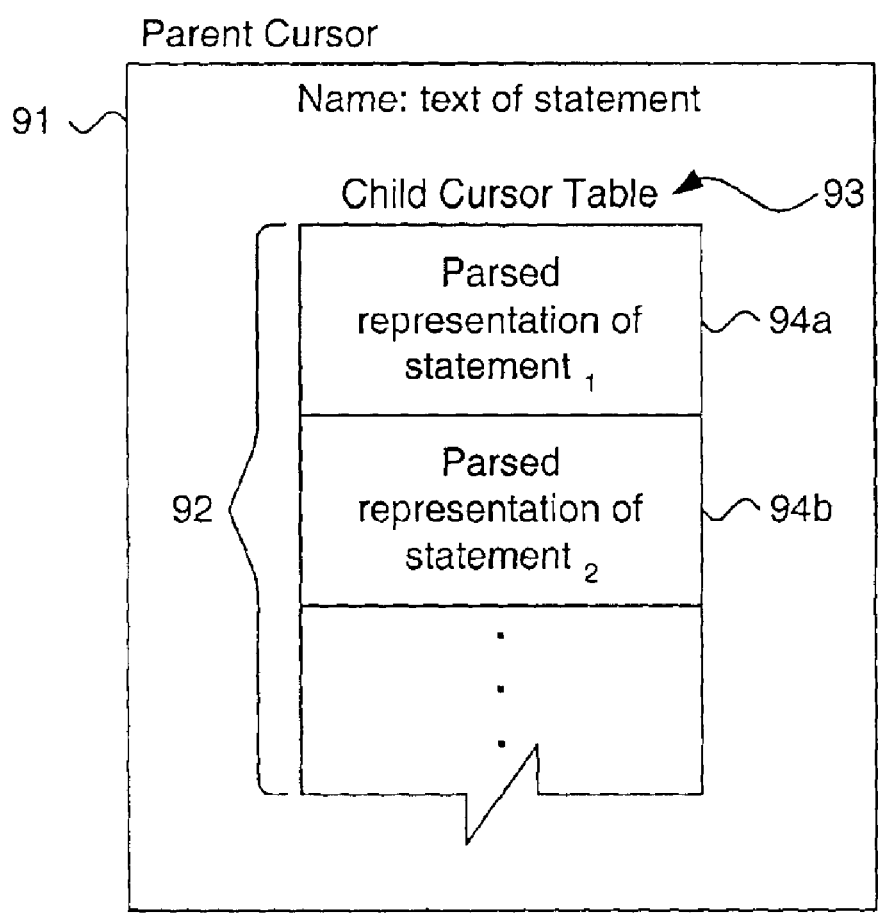
FIG. 5 is a data structure diagram showing a parent and child cursors extracted by the system of FIG. 3.

FIG. 5 is a data structure diagram 90 showing a parent cursor 91 and child cursors 92 extracted by the system 50 of FIG. 3. Cursors 57 are stored in the source library cache 56 (shown in FIG. 3) and are indexed by the text of the SQL or PL/SQL statement. When a cursor 56 is first parsed, a library cache object is created, called a parent cursor 91. Each parent cursor 91 is identified using a hash value created from the text of the statement, plus the text of the statement.

A table of child cursors 93 is created within each parent cursor 91. Each child cursor 92 is an object 94a-b containing a parsed representation of the statement. A parent cursor 91 can have multiple child cursors 92. A separate child cursor 92 is created for each different session issuing the same text using different objects and for different session environments. The extraction process 58 extracts a description of each parent cursor 91, plus a description of the parsing schema and session environment for each child cursor 92.

Referring back to FIG. 4, the extraction process 58 extracts the following data recorded with each cursor 57. Normally, this data is used at runtime to determine if a cursor 57 is sharable:
 (1) Text of SQL statement.
 (2) Type of SQL statement (Select statement, PL/SQL statements, and data manipulation (DML statements)).
 (3) Parsing user and parsing schema used to establish dependent objects, authorizations, and object statistics for each child cursor.
 (4) Parsing session environment.
 (5) Parsed representation of SQL statement and execution plan compiled using the parsing session environment.

(6) Type, maximum length, and precision description for each bind variable. The data items will now be described in more detail.

To be sharable, the text string of the cursor 57 that is compiled must be identical to that issued by the application. Thus, the text string is reconstructed in the target library cache 60, using the same case, same spaces, same comments, same hints to the optimizer, and same line structure as that on the source instance.

When a cursor 57 in the source library cache 56 is first parsed, a table 93 is constructed for all objects referenced in the cursor 57. This table 93 stores the handle of each object as referenced in the cursor 57, and the handle of each object to which the object translated under the session schema originally used to parse the statement. For a cursor to be sharable, all translations must result in the same base objects. Consequently, at the next request for type definition, the object handle is translated under the session schema trying to share the cursor for each entry in the stored table 93.

When preparing the target library cache 60, this process is reversed. The translation information is used to obtain the correct parsing schema and the correct user for every child cursor 92 (shown in FIG. 5). For example, suppose two users with different user identifiers share a cursor with the same base objects. The user-specific information is cached as an object 94a-b in the table of child cursors 93 for each child cursor 92.

At the source database instance 53, each child cursor 92 maintains a table that shows the level of authorization that was made to each object. When reconstructing the cursor 61 in the target library cache 60, this same information is used to establish the correct access to each dependent object. The authorization is then matched when the application session tries to share the cursor 61.

When a cursor 57 is first compiled in the source library cache 56, the version of the SQL language used by the client is stored in the child cursor 92. For each cursor 61 precompiled into the target library cache 60, the language version for the session and the language in the child cursor 92 must match.

The session preparing the target library cache 60 must compile each cursor 57 extracted from the source library cache 56 using an identical session environment as the source database instance 53. Three sets of environment parameters are needed:

(1) Settings that guide the optimizer to create an execution plan, including tracing and rules for sorting, used for the source cursor 57 (Table 1).

(2) Settings that guide the SQL execution and retrieval of data, such as the read ahead values and memory allocated for sorting (Table 1).

(3) Settings for national language, including language, territory, time, data and currency formats, used for the source cursor 57 (Table 2).

Tables 1 and 2 shown below summarize, by way of example, the settings needed for compiling cursors 57 in the described embodiment. Only session settings that differ from those for the source database instance 53 are extracted. A full session instantiation object is required whenever object instances differ. Other session-specific settings may also be required, as would be recognized by one skilled in the art.

TABLE 1

Optimizer and Session Preferences.

| Profile | Session Setting |
| --- | --- |
| Tracing | SQL diagnostic tracing enabled or disabled, with or without timing. |
| Cursor Rewrite | Cursor rewritten to use summary views for data warehouses. |
| Optimizer Preference | All rows, first rows, rule, or choose. |
| Parallel Execution. | Parallel force degree for DDL, DML, and query. |
| Parallel Execution. | Parallel force degree for database instances. |
| Percent Parallel | Percentage of parallelism for statement to execute. |
| Hash Join Profile | Whether hash join is enabled. |
| Search Limit | Upper limit on cost of optimizer plan. |
| Star Join Profile | Whether to transform SQL statement into a star join. |
| B-tree Bit Map | Plan for using bit map indices. |
| Indexes | Index behavior, for caches. For joins, skip unusable indexes. |
| Logical OR | Whether or not to expand logical OR. |
| Cursor Sharing | Force or exact. |
| Views | Rules for merging complex and partitioned views. |
| Sorting Profile | Amount of memory allocated for sorting and to retain after sorting. |
| Stored Outlines | Whether to use stored execution plans. |
| Long Operations | Threshold for considering operation long. |

TABLE 2

International Settings.

| Profile | Session Setting |
| --- | --- |
| International Settings | If cursor contains international variant, settings must match. Settings include date format, currency, language, territory, numeric characters, and sort order. |

The first time a cursor 61 is executed by the source database instance 53, type-checking is performed and the types of the bind variables are recorded in the child cursor 92. For a cursor 57 to be shared, subsequent executions must have the same bind types with equal or shorter lengths. The extraction process 58 obtains the same bind name, same data type, and same precision as the source cursor 57. In the described embodiment, the bind length used in the target database instance 54 is set to a value equal to or greater than the bind length used in the source database instance 53. The bind length value is rounded up to the next-higher power of 2, which has the positive side effect of increasing performance after failover. As well, the number of child cursors with different bind variants based on bind length per parent cursor 91 is reduced.

Figure 6:
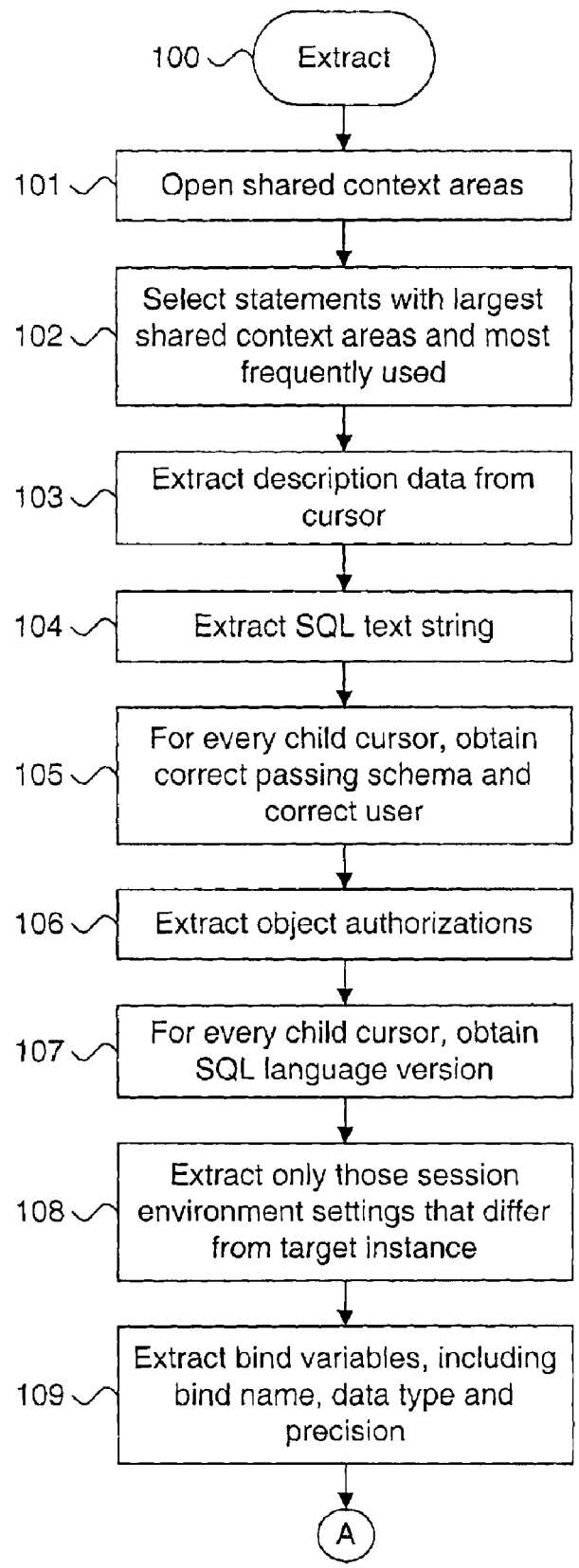
FIG. 6 is a flow diagram showing a method for extracting a source cursor from a target library cache in accordance with the present invention.
Figure 6:
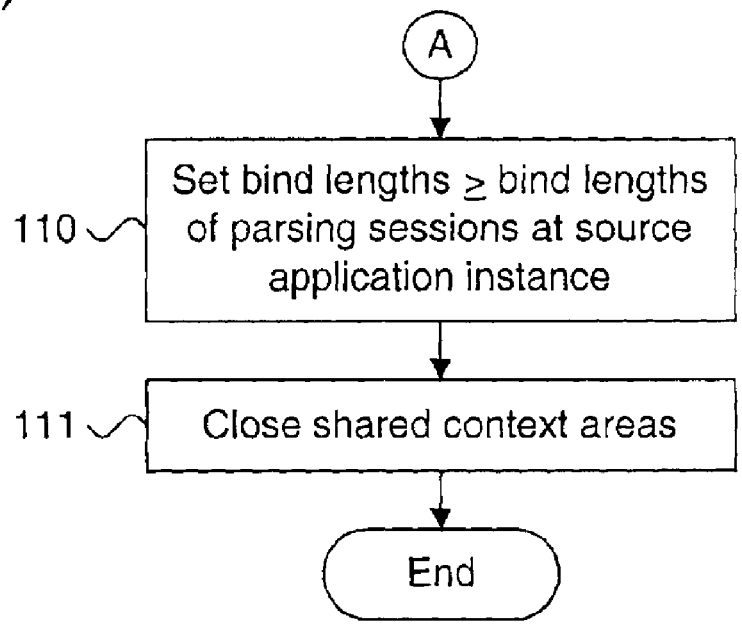

FIG. 6 is a flow diagram showing a method for extracting a source cursor 100 from a target library cache 56 (shown in FIG. 6) in accordance with the present invention. The purpose of this routine is to extract the shared context areas 71 for the cursors 57 in the source library cache 56 (shown in FIG. 4).

Thus, the shared context areas 71 are opened (block 101) and those statements with the largest shared context areas and most frequently use are selected (block 102). The description data 73 is extracted (block 103) as are the SQL text strings 74 (block 104). For every child cursor 92 (shown in FIG. 5), the parsing user and parsing schema are obtained (block 105). The object authorizations 76 are extracted (block 106). For every child cursor 92, the SQL language version 77 is obtained (block 107). Next, only those session environment settings 78 that differ from the target database instance 54 (shown in FIG. 4) are extracted (block 108). The bind variables 79 are extracted (block 109), including the bind name, data type, and precision, as described above. The bind lengths are set to a length greater than or equal to the bind lengths of the parsing sessions at the source database instance 53 (block 110). In the described embodiment, the bind lengths are generated in even powers of two, and rounded up as necessary. The increased bind lengths can result in enhanced performance on the target database instance 54. Finally, the shared context areas 71 are closed (block 111), after which the routine completes.

Figure 7:
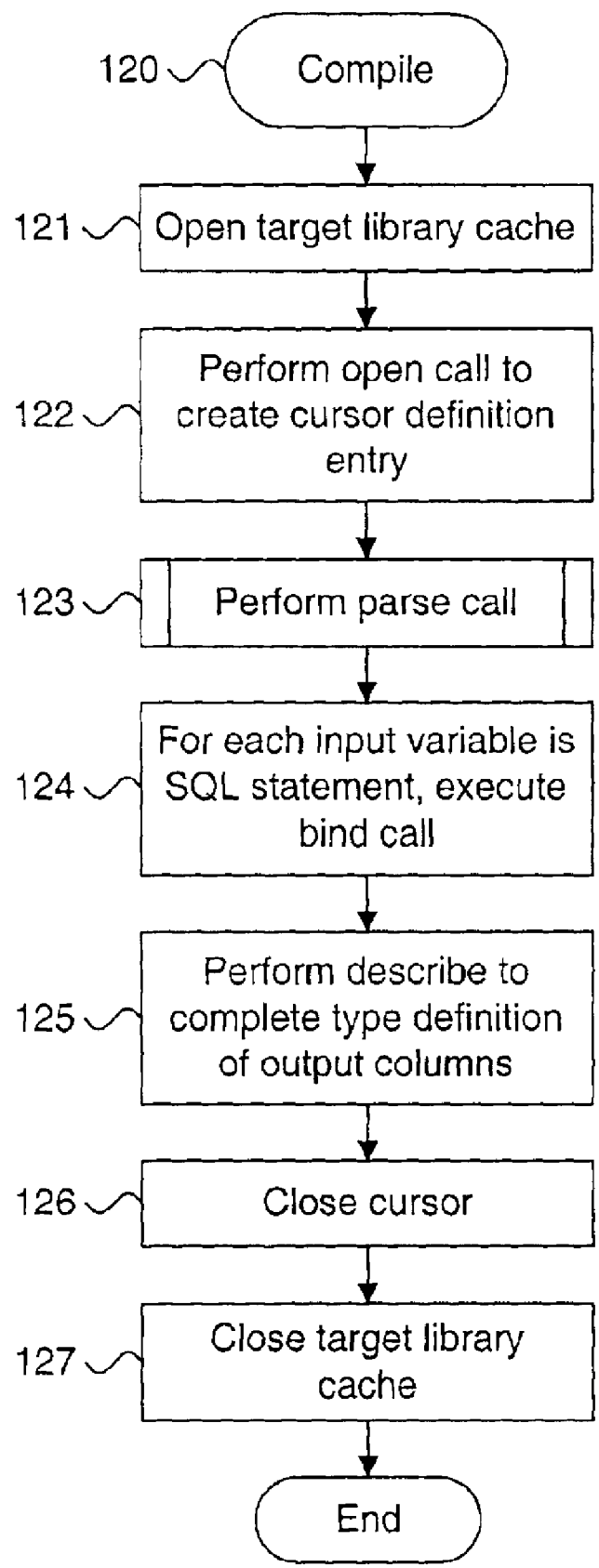
FIG. 7 is a flow diagram showing a routine for compiling an extracted source cursor into a target library cache in accordance with the present invention.

FIG. 7 is a flow diagram showing a routine for compiling an extracted source cursor 120 into a target library cache 56 in accordance with the present invention. The purpose of this routine is to pre-compile the extracted cursors 56 (shown in FIG. 3). Briefly, compiling the shared cursors consists of performing open, parse and bind operations. Type checking and execution plan functions normally performed during the first execution of the statements are performed, including describing type definitions without execution. All of these steps are executed in advance for Select statements. Only the open and parse functions are executed in advance for PL/SQL and DML statements. Note that for PL/SQL statements, performing the open and parse functions results in the loading of sharable heaps into the target library cache 60.

The compilation process uses the description data 73 (shown in FIG. 4) extracted from the source name database instance 53. Before compiling the cursor 61, the correct language version 77, correct object translation, and correct environment settings 78 are established. In the described embodiment, the implementation is optimized to execute in parallel and to handle error conditions that prevent compilation, such as references by a cursor 56 to objects that are no longer valid.

Thus, the target library cache 60 is opened (block 121). An open call is performed to create cursor definition entries in the target library cache 60 (shown in FIG. 3) (block 122). The open call is used to obtain a cursor identification that does not allocate the actual cursor 61 in the target library cache 60.

Next, a parse call is performed (block 123), as further described below with reference to FIG. 8. Upon the completion of parsing, a bind call is executed for each input variable in the SQL statement or PL/SQL block (block 124). The bind phase allocates the bind operators in the sharable part of the cursor 61 for each bind variable encountered during the parsing phase. The total number of bind variables, highest bind variable by position, and optimizations to access repeated bind data are established in the parent cursor 91 (shown in FIG. 5). This information is shared by all children cursors 92. Data types are set to a default value at bind, pending the type definition step, and separate calls are used for binding data and binding arrays.

Next, the describe operation is performed to complete the type definition of output columns (block 125). Using this command, a query is performed without an execution for Select statements only. The command returns a description of the Select list and forces the execution plan to be compiled.

The cursor 61 is closed (block 126). Any session objects that were instantiated during parsing are de-instantiated, thereby releasing the reference to the shared context area. The cursor definition established during the open operation is marked "free," and the sharable cursor object 94a-b remains in the target library cache 60. Finally, the target library cache 60 is closed (block 127), after which the routine completes.

Figure 8:
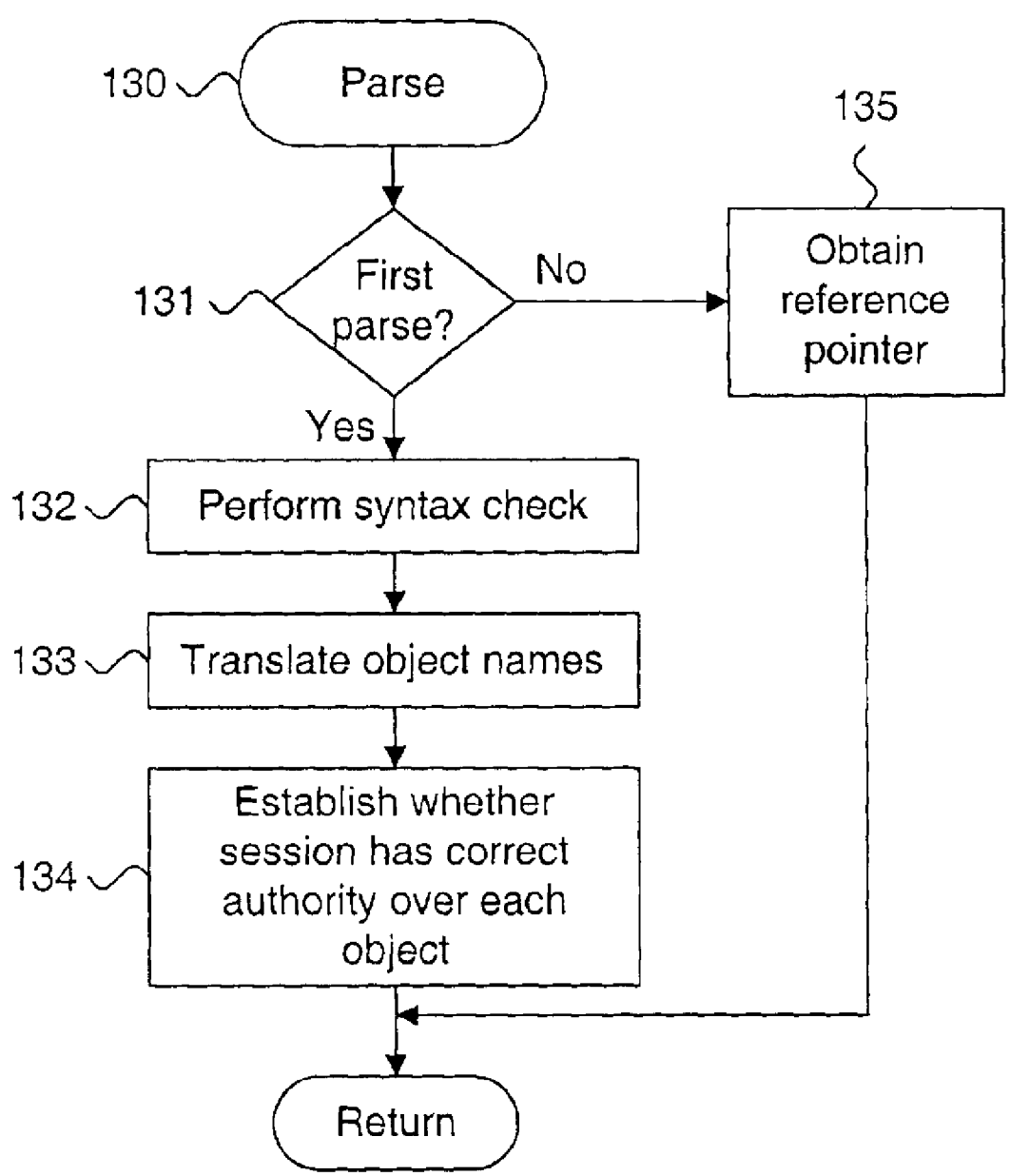
FIG. 8 is a flow diagram showing the routine for parsing an extracted source cursor for use in the method of FIG. 7.

FIG. 8 is a flow diagram showing the routine for parsing an extracted source cursor 130 for use in the method 120 of FIG. 7. The purpose of this routine is to instantiate a cursor 61 in the target library cache 60 of the target database instance 54 (shown in FIG. 3).

Thus, when called for the first time (block 131) a new shared context area is created (blocks 132–134), as follows. First, a syntax check on the statement is performed (block 132). The object names are translated (block 133). Finally, the correct authorization over each object for the session is established (block 134). Otherwise, if the parsing call is a repeated execution (block 131), the instantiation references an existing cursor and a reference pointer is obtained and returned (block 135). The routine then completes.

Figure 9:
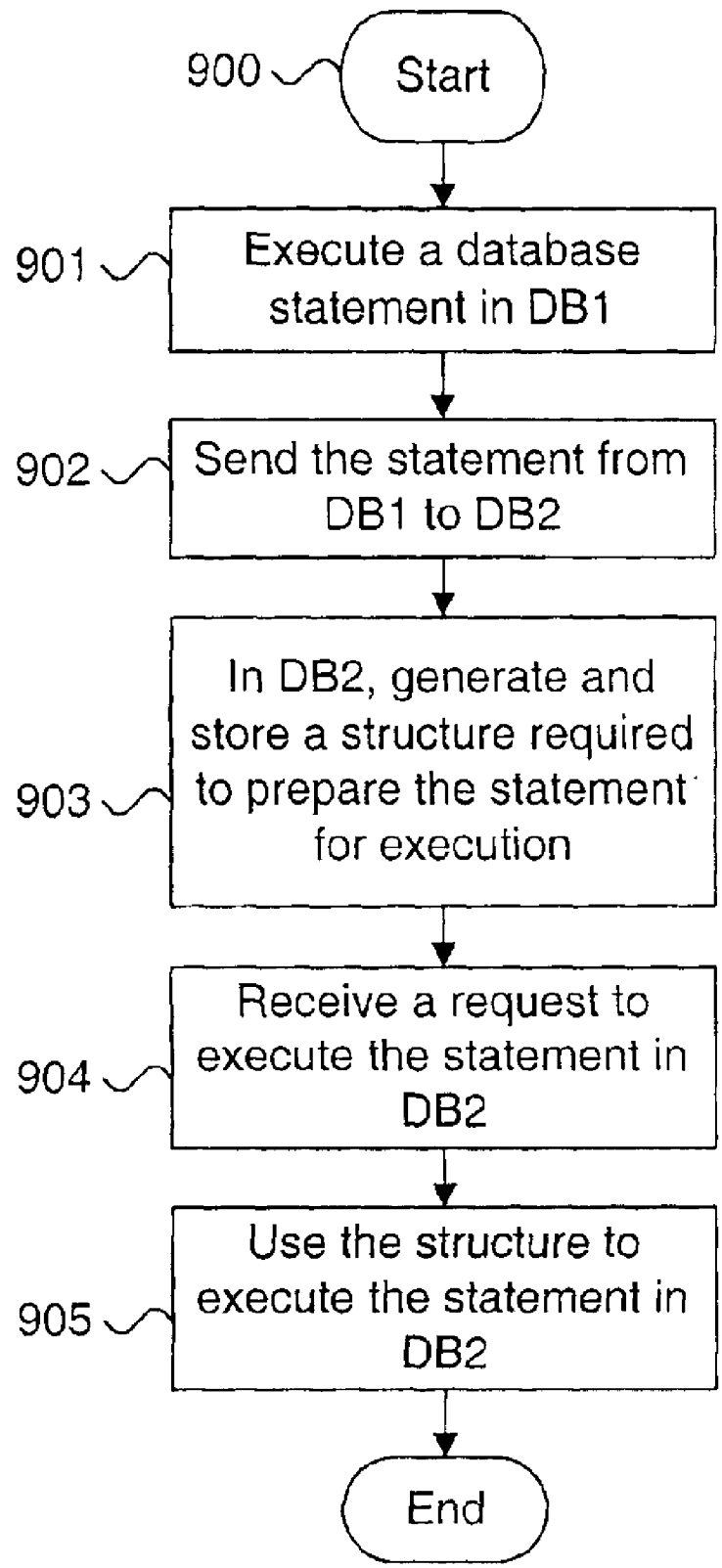
FIG. 9 is a flow diagram showing a technique for warming a library cache, in accordance with the invention.

FIG. 9 is a flow diagram showing a technique 900 for warming a library cache, in accordance with the invention. A first database instance executes a database statement (block 901). The database statement could be a PL/SQL statement or an SQL statement, including either a query, such as a SELECT statement, or a DML operation, such as an INSERT or UPDATE statement, or any other statement in a database access language.

The first database instance sends the database statement to a second database instance (block 902), in anticipation of the possibility that the second database instance could later take on a similar workload as that currently handled by the first database instance, and, in particular might receive a request to execute the same database statement. In some embodiments, the first database instance sends the statement prior to and in anticipation of a planned shutdown of the first database instance. In other embodiments, the first database sends the statement in anticipation of a possible future unplanned shutdown of the first database instance, in which case the statement can be sent at some predetermined time, such as the time when the statement was received, a time when the second database instance has requested the transfer of one or more statements, or a time determined by a schedule for periodically sending to the second database instance statements submitted to the first database instance.

In other embodiments, there might be other reasons for anticipating that the second database instance might in the future be handling a similar workload as the first database instance. For instance, a multinational company might have database instances located throughout many time zones. A database instance for a time zone that is about to enter daytime hours might be expected to receive a similar workload as that currently handled by a database instance for a time zone that is already in daytime hours.

The second database instance generates and stores one or more structures required for preparing the received database statement for future execution (block 903). In one embodiment, the second database instance parses the database statement, including checking for syntactic validity, and generates a parsed representation, often called a parse tree, for the statement. In the described embodiment, if at some point in the future, a request to execute the same database statement is received, the second database instance does not need to generate the parse tree for the statement prior to generating an execution plan and thus is able to execute the query faster than had the second database instance not previously generated a parse tree for the statement.

In another embodiment, in addition to generating a parse tree for the statement, the second database instance generates, using the parse tree, an execution plan for the statement. An execution plan provides the database with a step-by-step recipe for executing the database statement, including for example, the order and method by which tables are accessed or joined. In the described embodiment, if at some point in the future, a request to execute the same database statement is received, the second database instance can execute the previously generated execution plan for the statement, thereby avoiding the potentially time-consuming operations of generating a parse tree and an execution plan for the statement.

The second database instance receives a request to execute the same statement that was earlier sent (block 904). After receiving the request, the second database instance uses the one or more of the previously-generated structures to execute the statement (block 905).

Figure 10:
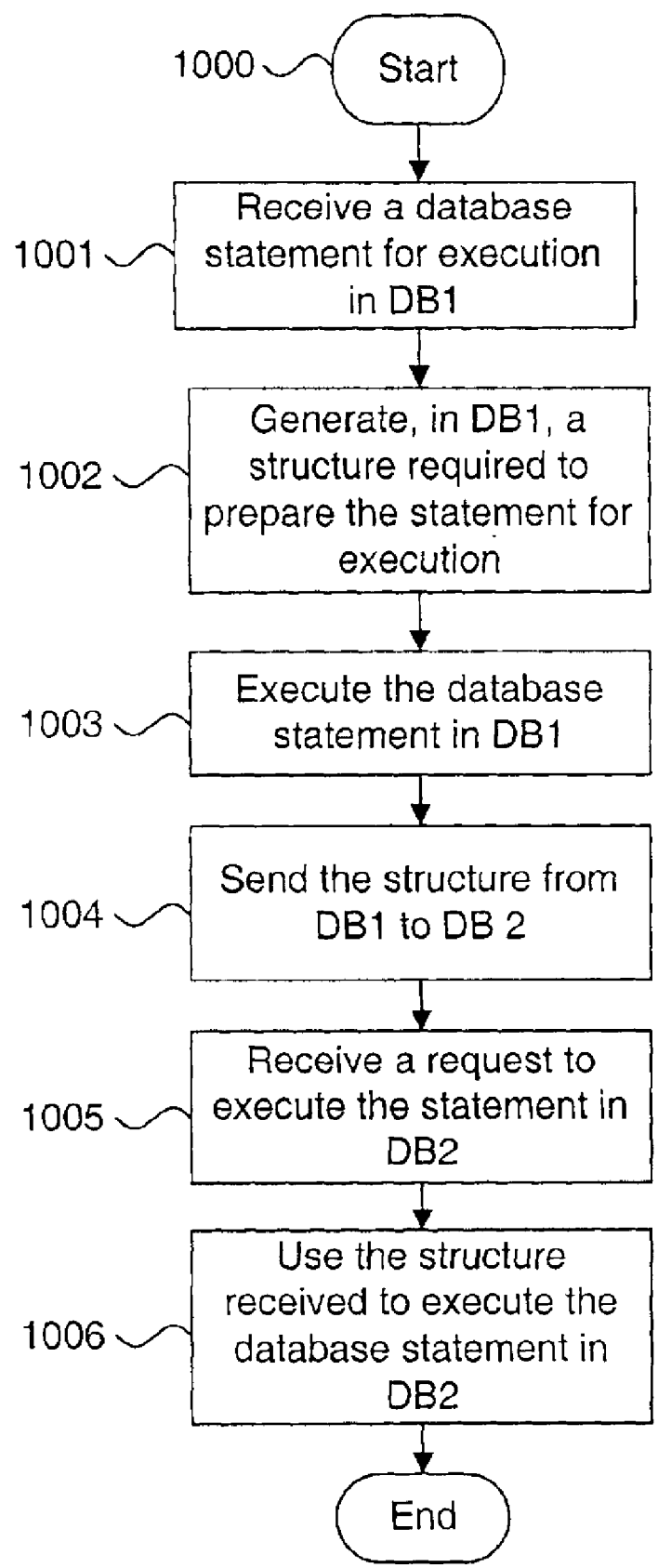
FIG. 10 is a flow diagram showing a technique for warming a library cache, in accordance with the invention.

FIG. 10 is a flow diagram showing a technique 1000 for warming a library cache, in accordance with the invention. A first database instance receives a request to execute a database statement (block 1001). The database statement could be a PL/SQL statement or an SQL statement, including a query, such as a SELECT statement, or a DML operation, such as an INSERT or UPDATE statement, or any other statement in a database access language. The first database instance generates one or more structures required to prepare the database statement for execution (block 1002). In one embodiment, the one or more structures include a parse tree and an execution plan for the statement. The first database instance executes the statement (block 1003).

The first database instance sends one or more of the previously-generated structures to a second database instance (block 1004), in anticipation of the possibility that the second database instance might at some point in the future take on a similar workload as that currently handled by the first database instance, and in particular, might receive a request to execute the same database statement. In some embodiments, the first database instance sends the one or more structures prior to and in anticipation of a planned shutdown of the first database instance. In other embodiments, the first database sends the one or more structures in anticipation of a possible future unplanned shutdown of the first database instance, in which case the structures can be sent at some predetermined time, such as when the statement is received at the first database instance, when the second database instance requests the transfer of structures generated by the first database instance in preparation of one or more statements for execution, or as determined by a schedule for periodically sending to the second database instance structures generated by the first database instance in preparation of one or more statements for execution.

In other embodiments, there may be other reasons for anticipating that the second database instance might in the future be handling a similar workload as the first database instance. For instance, a multinational company might have database instances located throughout many time zones. A database instance for a time zone that is about to enter daytime hours might be expected to receive a similar workload as that currently handled by a database instance for a time zone that is already in daytime hours.

The second database instance receives a request to execute the same statement received by the first database instance (block 1005). After receiving the request, the second database instance uses the one or more previously-sent structures to execute the statement (block 1006). In one embodiment, the structures include a parse tree for the statement, thereby relieving the second database instance of the need to parse the database statement when received in the request. In another embodiment, the one or more structures include an execution plan for the database statement, thereby relieving the second database instance of the need to generate an execution plan for the database statement when received in the request.

While the invention has been particularly shown and described as referenced to the embodiments thereof, those skilled in the art will understand that the foregoing and other changes in form and detail may be made therein without departing from the spirit and scope of the invention.

What is claimed is:

1. A method for processing a request, comprising the steps of:
    storing a first cursor in a first node, said first cursor comprising a shareable part and a non-sharable part;
    establishing a second cursor based on the shareable part of the first cursor;
    retaining the second cursor at the second node, wherein the second cursor is not executed while said first node continues to be able to execute said first cursor; and
    causing a client to interact with said second node in response to said first node ceasing to be able to execute said first cursor.

2. The method of claim 1, wherein the first node is a first database server, and the second node is a second database server.

3. The method of claim 1, further comprising the step of executing said second cursor at said second node after the first node ceases to be able to execute said first cursor.

4. The method of claim 3, wherein a non-sharable part of said second cursor is created upon execution of said second cursor.

5. The method of claim 1, further comprising the step of transmitting the shareable part of the first cursor to the second node in anticipation of said first node not being able to execute said first cursor.

6. The method of claim 1, further comprising the step of transmitting the shareable part of the first cursor to the second node prior to an indication that said first node will be unable to execute said first cursor.

7. The method of claim 1, further comprising the step of transmitting the shareable part of the first cursor to the second node in response to a shutdown of said first node.

8. The method of claim 1, further comprising the step of recreating at said second node at least one of recursive cursors and system cursors.

9. The method of claim 1, further comprising the step of extracting said sharable portion of said first cursor.

10. The method of claim 9, wherein the step of extracting said sharable portion of said first cursor extracts data of at least one type, wherein said type is a member of a group consisting of bind variables data, session environment data, language version data, object authorization data, object names data, SQL text string data, and description data.

11. The method of claim 1, wherein the step of compiling the shareable part of the first cursor to form a second cursor at the second node comprises:

generating an execution plan for an operation associated with said second cursor.

12. The method of claim 1, wherein the step of compiling the shareable part of the first cursor to form a second cursor at the second node comprises:

generating a parse tree for an operation associated with said second cursor.

13. A computer-readable medium carrying one or more sequences of instructions for processing a request, wherein execution of the one or more sequences of instructions by one or more processors causes the one or more processors to perform the steps of:

storing a first cursor in a first node, said first cursor comprising a shareable part and a non-sharable part;

establishing a second cursor based on the shareable part of the first cursor;

retaining the second cursor at the second node, wherein the second cursor is not executed while said first node continues to be able to execute said first cursor; and causing a client to interact with said second node in response to said first node ceasing to be able to execute said first cursor.

14. The computer-readable medium of claim 13, wherein the first node is a first database server, and the second node is a second database server.

15. The computer-readable medium of claim 13, further comprising the step of executing said second cursor at said second node after the first node ceases to be able to execute said first cursor.

16. The computer-readable medium of claim 15, wherein a non-sharable part of said second cursor is created upon execution of said second cursor.

17. The computer-readable medium of claim 13, further comprising the step of transmitting the shareable part of the first cursor to the second node in anticipation of said first node not being able to execute said first cursor.

18. The computer-readable medium of claim 13, further comprising the step of transmitting the shareable part of the first cursor to the second node prior to an indication that said first node will be unable to execute said first cursor.

19. The computer-readable medium of claim 13, further comprising the step of transmitting the shareable part of the first cursor to the second node in response to a shutdown of said first node.

20. The computer-readable medium of claim 13, further comprising the step of recreating at said second node at least one of recursive cursors and system cursors.

21. The computer-readable medium of claim 13, further comprising the step of extracting said sharable portion of said first cursor.

22. The computer-readable medium of claim 21, wherein the step of extracting said sharable portion of said first cursor extracts data of at least one type, wherein said type is a member of a group consisting of bind variables data, session environment data, language version data, object authorization data, object names data, SQL text string data, and description data.

23. The computer-readable medium of claim 13, wherein the step of compiling the shareable part of the first cursor to form a second cursor at the second node comprises:

generating an execution plan for an operation associated with said second cursor.

24. The computer-readable medium of claim 13, wherein the step of compiling the shareable part of the first cursor to form a second cursor at the second node comprises:

generating a parse tree for an operation associated with said second cursor.

* * * * *